United States Patent [19]

Schaeffer et al.

[11] 4,439,041
[45] Mar. 27, 1984

[54] FEED BUSHING FOR SINGLE-SCREW EXTRUDERS

[75] Inventors: Gerard Schaeffer, Lampertheim; Dieter Hoffarth, Worms, both of Fed. Rep. of Germany

[73] Assignee: Paul Kiefel GmbH, Worms, Fed. Rep. of Germany

[21] Appl. No.: 365,101

[22] Filed: Apr. 2, 1982

[30] Foreign Application Priority Data

Apr. 7, 1981 [DE] Fed. Rep. of Germany ... 8110512[U]

[51] Int. Cl.³ .......................................... B01F 15/06
[52] U.S. Cl. ..................................... 366/144; 366/79; 366/349; 165/47; 165/169
[58] Field of Search ....................... 366/75, 76, 77, 78, 366/79, 83, 84, 88, 89, 90, 91, 348, 349, 144, 145, 146, 147, 148, 149; 425/207, 208; 165/47, 169

[56] References Cited

U.S. PATENT DOCUMENTS

| | | | |
|---|---|---|---|
| 2,200,997 | 5/1940 | Royle | 366/90 |
| 3,375,549 | 4/1968 | Geyer | 366/90 |
| 3,900,188 | 8/1975 | Seufert | 366/79 |
| 4,136,969 | 1/1979 | Meyer | 366/90 |

*Primary Examiner*—Robert W. Jenkins
*Attorney, Agent, or Firm*—Staas & Halsey

[57] ABSTRACT

A feed bushing for single-screw extruders for the plasticizing extrusion of plastics under a high inertia resistance comprising an outer casing, a grooved bushing enclosed in the outer casing, and a cooling system. The groove bushing is assembled from a tubular grooved inset and a tubular reinforcement surrounding the grooved inset, the inset being shrink-fitted into the reinforcement with such a high shrinkage allowance that the inset is prestressed for pressure by the reinforcement for withstanding the maximum forces of inertia of the screw received in the grooved bushing. The grooved inset of the grooved bushing is made of cemented carbide, a metal oxide or other extremely hard and wear-resistant material. The reinforcement element is made of high-strength ductile steel.

11 Claims, 1 Drawing Figure

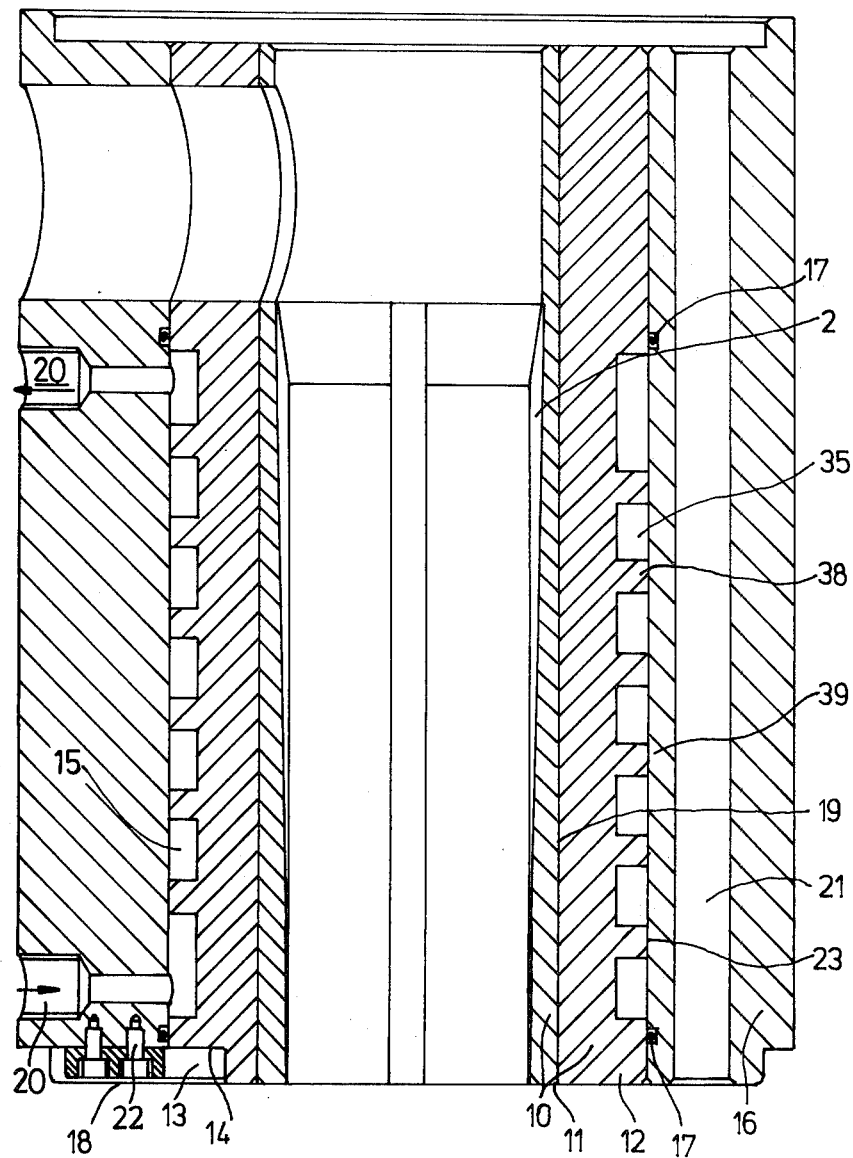

FEED BUSHING FOR SINGLE-SCREW EXTRUDERS

BACKGROUND OF THE INVENTION

The invention relates to a feed bushing for single-screw extruders which consists of a grooved bushing, an outer casing and a cooling system.

The processing of very high-molecular-weight and high-viscosity thermoplastics in single-screw extruders today is usually done only in extruders with a positive-conveying feed section. This system offers a great many advantages over conventional extrusion. Among these are high output at low melting temperatures and high melt pressures; reduced shear of the plastics, which makes this system energy-saving and very economical; gentle plastication of the plastics; no thermal or chemical degradation, hence optimum product quality; and particularly stable extrusion so that output, pressure and melting-temperature surges are prevented.

With this system, a very high efficiency of polymer movement and melt-pressure buildup is achieved by the use of a water-cooled feed section with a plurality of conically expanding grooves which are uniformly distributed in the bore of the feed section over a length of about three diameters.

In this system, so-called mixing-section screws having shearing and mixing sections are used as best suited. The ejection cylinder comprising one or more heating and cooling collars is flanged directly to the feed section.

However, with this extruder design comprising a water-cooled and grooved feed bushing, satisfactory and trouble-free operation is assured only when the plasticating elements in the feed section are extremely wear-resistant. Now in the extrusion of high-molecular-weight and colored polymers, the wear is caused by the hard pigments and the high pressures in the grooved zone. The abrasive wear of the surfaces increases with the melt pressure in the grooved zone (which may be as high as 2000 kg/cm$^2$) and with the hardness of the pigments (Vickers hardness numbers of up to 1800).

A further requirement is that the feed section be vigorously water-cooled for removal of the heat of friction of the granules in the grooved zone. However, depending on the hardness of the cooling water and the degree to which it carries impurities, the cooling channels may become encrusted with calcium deposits even after a short time.

Experience has shown that when the plasticating elements close up or the cooling channels become clogged the extruder cannot be relied on to work properly. Serious malfunctions will then occur in short order. The conveying efficiency then falls off sharply, with the result that the output decreases, the melting temperature rises and the melt pressure drops. The plastic then undergoes thermal and chemical degradation. Moreover, extrusion then is no longer steady but pulsating. Production with a worn-out or calcium encrusted feed bushing thus is not possible, and the extruder is not fit for use.

One way of solving the wear problem is to use deep-hardened screws and grooved bushings made of tool steel. In the case of extruders which are subjected to very high loads, and in the handling of highly abrasive plastics, the grooved inset may even be fabricated from cemented carbides.

Feed bushings consisting of a grooved bushing made of a wear-resistant material and having conically expanding grooves in their bore are known.

The feed bushing with the cooling channel on the outer periphery thereof is shrink-fitted into the outer casing. Through bores in the latter serve for mounting the feed bushing on the extruder drive.

With this design, to prevent fracture of the grooved bushing the allowance for shrinkage to the outer casing must be very high so that with maximum melt pressures in the screw of up to 2000 kg/cm$^2$ the grooved bushing is always prestressed for pressure.

In the fabrication of a grooved bushing from hardened steel or cemented carbide, the shrinkage allowance is set so high that the grooved bushing cannot later be forced out of the outer casing.

Calcium-encrusted or clogged cooling channels then cannot be cleaned out without complete destruction of the outer casing. Depending on the hardness of the cooling water and the degree to which it carries impurities, such a feed bushing may become inoperative after a very short operating time because of inadequate water cooling and must then be replaced with a complete new feed bushing even though no wear is discernible in its bore.

SUMMARY OF THE INVENTION

The object of the invention is to provide a feed bushing which overcomes the drawbacks outlined above. In particular, the grooved bushing should be replaceable without the whole feed bushing having to be destroyed. Moreover, it should be possible to clean out the cooling channels readily and at regular intervals without the outer casing having to be destroyed.

In accordance with the invention, this object is accomplished in that the grooved bushing is assembled from a tubular grooved inset and a tubular reinforcement which surrounds the grooved inset, the grooved bushing having the inset and reinforcement then being enclosed in an outer casing.

The grooved bushing is formed of an extremely wear-resistant grooved inset which is shrink-fitted into a reinforcement through a press fit that is not adapted to be disassembled. The extremely wear-resistant grooved bushing thus is removable and replaceable. The grooved inset is made of a hard, wear-resistant material. The reinforcement is made of a high-strength, tough steel which will withstand very high tensile stresses.

The shrinkage allowance for the press fit between grooved inset and reinforcement is set so high that the grooved inset, made of a brittle and hard material, is always prestressed for pressure by the high-strength reinforcement at the maximum melt pressures in the screw. The grooved inset therefore cannot fracture as a result of the buildup of pressure in the screw. The grooved bushing with the reinforcement is installed in the outer casing. The fit between the reinforcement and outer casing will depend on the loading and use made of the extruder:

1. In the case of an extruder subjected to normal loads, the fit is made with very little clearance, that is to say, a small shrinkage allowance. With such a fit, the grooved bushing can always be removed without the outer casing having to be destroyed.

2. In the case of special extruders subjected to very high loads, or in the processing of extremely high-viscosity plastics, the melt pressure in the extruder screw rises to such extremely high levels that the simple reinforcement will not absorb it. In that case, the grooved inset must be prestressed still higher through double reinforcement by means of the reinforcement and of the outer casing. Such double reinforcement permits very high prestressing to be produced in the grooved inset.

A feed bushing so designed is able to withstand operating pressures or momentary overloads of up to 4000 kg/cm$^2$.

In a particularly preferred embodiment, the grooved inset is provided with a plurality of conically expanding grooves which are uniformly distributed in the bore of the feed bushing over a length of about three diameters.

In accordance with a further preferred embodiment, the cooling system comprises a cooling channel which is helically machined into the external surface of the reinforcement. The cooling channels can then be repeatedly cleaned out when they have become encrusted with calcium or clogged. The feed bushing can be relied on to remain operative as long as there is no wear in the bore.

The cooling system preferably comprises a cooling channel which has been helically machined into the internal surface of the outer casing. Providing cooling channels in the internal surface of the outer casing rather than in the reinforcement, as described above, may be of advantage when special materials of construction are used, particularly in the case of special extruders subjected to very high loads. In this design, the grooved bushing consists of a grooved inset with conically expanding grooves and a reinforcement. The cooling channels then are machined into the bore of the outer casing.

In accordance with a particularly preferred embodiment, the outer casing is provided on its inside with at least two sealing rings.

Two sealing rings disposed ahead of and after the cooling channel, respectively, will provide satisfactory sealing. These sealing rings are of the same design in both alternative designs (cooling channel in the reinforcement versus cooling channel in the outer casing).

In accordance with a further particularly preferred embodiment, at least one feather key which penetrates into a recess in the reinforcement is mounted on the outer casing at the lower end of the feed bushing.

Relative rotation between the grooved bushing and the outer casing is thus prevented by at least one feather key which is secured to the outer casing by means of two sockethead screws.

The grooved inset is preferably made of a cemented carbide, a metal oxide or another extremely hard and wear-resistant material.

For example, the grooved inset may be made of the following wear-resistant materials: Deep-hardened tool steels, cemented carbides, ceramics, or cements.

The reinforcement is preferably made of a high-strength, ductile steel.

The reinforcement is made of a high-strength, tough steel which will withstand very high tensile stresses.

In addition to the advantages outlined, the new feed bushing described above has further advantages over the prior-art design.

In the first place, uniform compressive and tensile shrinkage stresses are obtained in the grooved inset and in the reinforcement. This is due to the fact that the cooling channels are machined into the outer circumference of the reinforcement. In the prior-art design, the stresses are considerably lower in the vicinity of the cooling channels in the grooved bushing and in the outer casing than in proximity to the contact lands. Moreover, the contact surface of the press fit is substantially larger than the contact surface of the lands between the grooved bushing and the outer casing of the prior-art designs. With operating melt pressures of equal magnitude in the screw, this permits the shrinkage allowance in the new feed bushing to be made smaller. Because of the uniform stress pattern and the simple design of the shrink assembly of the new feed bushing, the reinforcement is not weakened by notch effects and metal fatigue.

In contrast thereto, in the prior-art design the through bores and the water connections in the outer casing, which is subject to high stresses, are highly susceptible to fracture, and metal fatigue is likely to occur in the vicinity of the contact lands.

For all these reasons, the strength and resistance to fracture of the new design are substantially higher.

A further advantage lies in the fact that the cooling water is not in direct contact with the grooved inset.

Because of the extremely high hardness, the high modulus of elasticity and the low coefficient of linear expansion of the cemented carbide, the thermal stresses produced by sudden cooling of a hot feed section by water might cause the grooved inset to burst. This could happen as a consequence of an operating error, and particularly when it was neglected to turn on the water-cooling system. In the prior-art design, this risk is very high when the cold cooling water makes direct contact with the cemented carbide. With the new design, no such thermal stresses will be set up in the cemented-carbide inset since the cooling effect is very considerably attenuated by the steel mass of the reinforcement.

This new feed bushing can be installed in all modern single-screw extruders using water-cooled grooved feed bushings. It is particularly economical in the processing of very high-molecular-weight and pigment-filled plastics.

Processing advantages are secured when the new feed bushing is used in extruders designed for the following applications:

Extruders for the production of blown film, flat film and coextruded film.

Extruders for the production of tubing, profiles, plates and other semimanufactures.

Compounding extruders and reclaiming equipment.

Extruders for use in blow-molding lines.

BRIEF DESCRIPTION OF THE DRAWINGS

FIG. 1 is a sectional view of a feed bushing in accordance with the invention.

DESCRIPTION OF THE PREFERRED EMBODIMENT

An embodiment of the invention is illustrated in the drawing and will now be described in greater detail.

FIG. 1 is a sectional view of a feed bushing 1 which comprises a grooved bushing 10 consisting of a grooved inset 11 provided with conically expanding grooves 2 and a reinforcement 12. The extremely wear-resistant grooved inset 11 is shrink-fitted into the reinforcement 12 through a press fit 19 which is not adapted to be disassembled. The grooved inset 11 may be made of a cemented carbide, a metal oxide or another extremely hard and wear-resistant material. The reinforcement 12 is made of a high-strength, tough steel which will withstand very high tensile stresses. The shrinkage allowance of the press fit 19 is set so high that at the maximum melt pressures in the extruder screw the grooved inset 11, made of a brittle, hard material, is at all times prestressed for pressure by the high-strength reinforcement 12. Fracture of the grooved inset 11 due to the pressure buildup in the screw thus cannot occur. A cooling channel 35 is machined into the external surface 38 of the reinforcement 12. The grooved bushing 10 described above is set into the outer casing 16. Two sealing rings 17 disposed ahead of and after the cooling channel 35 provide satisfactory sealing. The bores 20 are provided for the water connections of the cooling channel. The through bores 21 permit the feed bushing 1 to be secured to the gear case of the extruder. The grooved bushing 10 is secured against rotation relative to the outer casing 16 by means of at least one feather key 13, fastened to the outer casing 16 through two socket-head screws 22, for example, and which penetrates into a recess 14 in the reinforcement.

The fit 23 between the reinforcement 12 and the outer casing 16 may be of different designs, depending on the loading and use made of the extruder, as explained above.

When special materials of construction are used, it may be advantageous to machine the cooling channels 35 of the cooling system 15, not into the reinforcement 12 but into the outer casing 16. With this design, the grooved bushing 10 still consists of the grooved inset 11 with the conically expanding grooves 2 and the reinforcement 12, but witnhout channels therein.

The cooling channels 35 then are machined into the internal surface 39 of the outer casing 16. This is not shown in FIG. 1. In this alternative design, the sealing rings 17, water-connection bores 20, through bores 21 and feather key 13 with the socket-head screws 22 are of the same design.

We claim:

1. A feed bushing for single-screw extruders for the plasticizing extrusion of plastics under a high inertia resistance comprising an outer casing, a grooved bushing enclosed in the outer casing and receiving the screw of the extruder and a cooling system, wherein the grooved bushing is assembled from a tubular grooved inset and a tubular reinforcement surrounding the grooved inset, the inset being shrink-fitted into the reinforcement with a shrinkage allowance for withstanding the maximum forces of inertia of the screw.

2. A feed bushing for single-screw extruders according to claim 1, wherein both the reinforcement and outer casing comprise a double prestressed reinforcement for the grooved inset.

3. A feed bushing for single-screw extruders according to claim 1, wherein the grooved inset is shrink-fitted into the reinforcement with such a high shrinkage allowance that the inset is prestressed for pressure by the reinforcement for withstanding the maximum forces of inertia of the screw.

4. A feed bushing for single-screw extruders according to claim 1, 2 or 3, wherein the grooved inset is provided with conically expanding grooves.

5. A feed bushing for single-screw extruders according to claim 1, 2 or 3 wherein the cooling system comprises a cooling channel helically machined into the external surface of the reinforcement.

6. A feed bushing for single-screw extruders according to claim 1, 2, or 3, wherein the cooling system comprises a cooling channel helically machined into the internal surface of the outer casing.

7. A feed bushing for single-screw extruders according to claim 1, 2 or 3, wherein at least two sealing rings are provided on the internal surface of the outer casing.

8. A feed bushing for single-screw extruders according to claim 1, 2 or 3, wherein the reinforcement has a recess and at least one feather key is secured to the outer casing at the lower end of the feed bushing for positioning into the recess.

9. A feed bushing for single-screw extruders according to claim 1, 2 or 3, wherein the grooved inset is made of a cemented carbide, a metal oxide or another extremely hard and water-resistant material.

10. A feed bushing for single-screw extruders according to claim 1, 2 or 3, wherein the reinforcement is made of a high-strength, ductile steel.

11. A feed bushing for single-screw extruders according to claim 1, 2 or 3, wherein the grooved inset is made of a cemented carbide, a metal oxide or another extremely hard and wear-resistant material and the reinforcement is made of a high-strength, ductile steel.

* * * * *